United States Patent
Lacombe et al.

(10) Patent No.: US 6,277,435 B1
(45) Date of Patent: Aug. 21, 2001

(54) KOSHER-MEAT BASED PET FOOD PRODUCTS

(76) Inventors: Martine Lacombe; Marc Michels, both of 3000 NE. 190th St., #315, Aventura, FL (US) 33180

( * ) Notice: Subject to any disclaimer, the term of this patent is extended or adjusted under 35 U.S.C. 154(b) by 0 days.

(21) Appl. No.: 09/793,659

(22) Filed: Feb. 26, 2001

(51) Int. Cl.$^7$ ........................................ A23L 1/31
(52) U.S. Cl. ..................... 426/646; 426/658; 426/807
(58) Field of Search ................................. 426/646, 658, 426/807

(56) References Cited

U.S. PATENT DOCUMENTS

| | | | |
|---|---|---|---|
| 2,682,466 | 6/1954 | Boyer | 426/104 |
| 3,482,998 | 12/1969 | Carrol et al. | 426/646 |
| 3,488,770 | 1/1970 | Atkinson | 426/104 |
| 3,644,121 | 2/1972 | Boyer et al. | 426/274 |
| 3,662,671 | 5/1972 | Frederiksen et al. | 426/656 |
| 3,946,123 | 3/1976 | Hanna | 426/643 |
| 4,218,482 | 8/1980 | Cook et al. | 426/72 |
| 4,551,343 | 11/1985 | Gellman et al. | 426/543 |
| 4,830,675 | 5/1989 | Skolnik | 134/3 |
| 4,910,038 | 3/1990 | Ducharme | 426/641 |
| 5,258,198 | 11/1993 | Bastian et al. | 426/615 |
| 5,294,458 | 3/1994 | Fujimori | 426/635 |
| 5,397,587 | 3/1995 | Thompson et al. | 426/557 |
| 5,616,569 | 4/1997 | Reinhart | 514/54 |
| 5,851,573 | 12/1998 | Lepine et al. | 426/74 |

OTHER PUBLICATIONS

"Azmira Nutritionals Canned Dog Formula," Product Alert, ISSN: 0740–3801, Mar. 23, 1998.*

"Renicom's Mother Klein's Kosher Style dog food", Advertising Age, p. 24, Feb. 26, 1979.*

"The challenge of keeping kosher", Stephen Bennet, Progressive Grocer, vol. 69(8), p.149(3), Jul. 1990.*

* cited by examiner

Primary Examiner—Chhaya D. Sayala

(57) ABSTRACT

A pet food composition is provided for domesticated cats and dogs which contains from about 15 to 60 weight percent of kosher meat. The composition further includes a source of carbohydrates, a source of fiber, and a source of fat. The pet food composition is fed to domesticated cats and dogs for which a kosher diet is recommended for health and/or spiritual reasons.

3 Claims, 1 Drawing Sheet

Figures 1, 2:
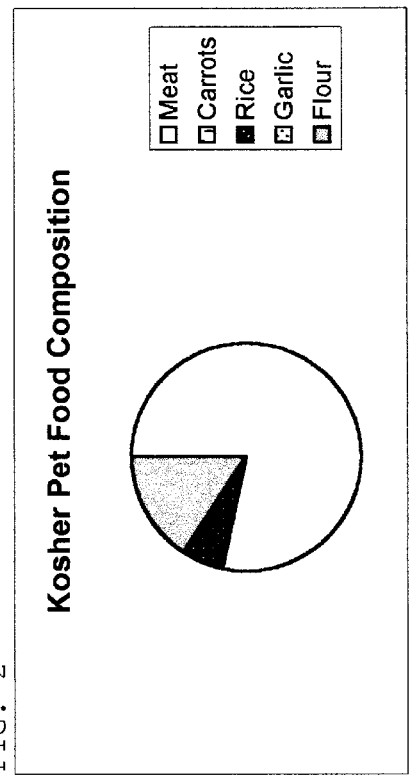

| Grams | 420 | 60 | 360 | 0 | 180 | 1020 | | | |
|---|---|---|---|---|---|---|---|---|---|
| | Meat | Carrots | Rice | Garlic | Flour | gross weight/gr | raw mass/% | dry weight/gr | Dry mass/% |
| Protein | 121.80 | 0.65 | 8.57 | 0.00 | 24.66 | 155.68 | 14.94% | 155.68 | 31.1% |
| Fat | 31.12 | 0.11 | 0.76 | 0.00 | 3.37 | 35.35 | 3.39% | 35.35 | 7.1% |
| Fiber | 0.00 | 1.98 | 1.08 | 0.00 | 21.96 | 25.02 | 2.40% | 25.02 | 5.0% |
| Moisture | 267.92 | 52.43 | 247.00 | 0.00 | 18.49 | 585.83 | 56.24% | 45.00 | 9.0% |
| Carbs | 0.00 | 6.29 | 102.92 | 0.00 | 130.63 | 239.84 | 23.02% | 239.84 | 47.9% |
| Total | 420.84 | 61.46 | 360.32 | 0.00 | 199.10 | 1041.72 | 100.00% | 500.89 | 100.0% |
| Percent | 40.4% | 5.9% | 34.6% | 0.0% | 19.1% | 100.0% | | 48.1% | |

| Ready product | | | | |
|---|---|---|---|---|
| Protein | 131.52 | | 131.52 | 26.83% |
| Fat | 29.87 | | 29.87 | 6.09% |
| Fiber | 21.14 | | 21.14 | 4.31% |
| Moisture | 494.91 | | 105 | 21.42% |
| Carbs | 202.62 | | 202.62 | 41.34% |
| Total | 880 | | 490.14 | 100.00% |
| Loss | 161.72 | | | |
| Percent | 15.52% | | | |

Kosher Pet Food Composition

☐ Meat
☐ Carrots
■ Rice
☒ Garlic
☐ Flour

KOSHER-MEAT BASED PET FOOD PRODUCTS

CROSS-REFERENCE TO RELATED APPLICATIONS

Not applicable

BACKGROUND—Field of Invention

This invention relates to pet food, specifically domesticated cats and dogs for which a kosher diet is recommended for health and/or spiritual reasons.

BACKGROUND—Description of Prior Art

Dog and cat foods are generally formulated from a combination of proteinaceous and farinaceous materials. The proteinaceous material is derived from either vegetable protein sources or from meat and/or meat by-product sources, and nutritional supplements are often added. The farinaceous material is derived from grain products and contains starch as a major component.

Generally, commercially available pet food is composed of the leftovers of the agriculture industry. Pet food provides a place for slaughterhouse waste and grains considered unfit for human consumption to be turned into profit. This waste includes esophagi and possibly diseased and cancerous meat.

The grains used have had the starch removed and the oil extracted—usually by chemical processing—for vegetable oil, or they are the hulls and other remnants from the milling process. Some of the truly whole grains used may have been deemed unfit for human consumption because of mold, contaminants, or poor storage practices.

The flesh of animals who fall into one of the categories of the four D's—dead, dying, diseased, or disabled—is what often goes into pet food. Many of these animals have died of infections, dehydration, or exposure to extreme heat or cold. In all but a few states, it is legal to remove unusable parts from chickens and sell them to pet food manufacturers. For example, some cheap or generic kibble-type dog food contains ground-up feathers. In the chicken inspection lines, deformed or tumorous legs are often cut off and put in a separate area for nonhuman consumption. Another source of meat not mentioned on conventional pet food labels are dogs and cats. In 1990 the San Francisco Chronicle reported that euthanized companion animals were being used in pet food. Although pet food manufacturers vehemently denied the report, the American Veterinary Medical Association confirmed the Chronicle's story.

Some veterinarians claim that feeding slaughterhouse wastes to animals increases their risk of getting cancer and other degenerative diseases. Commercially manufactured or rendered meat meals are highly contaminated with bacteria because their source is not always slaughtered animals. Animals that have died because of disease, injury, or natural causes are a source of meat for meat meal. The dead animal may not be rendered or cooked until days after its death. Therefore the carcass is often contaminated with bacteria—Salmonella bacteria contaminate 25–50% of meat meals. While the cooking process may kill bacteria, it does not eliminate the endotoxins that result from the bacteria. These toxins can cause disease.

While the AAFCO (American Association of Feed Control) established guidelines pertaining to the nutritional composition of pet food, it does not establish guidelines pertaining to the provenance of the ingredients.

Several types of pet foods have been proposed—for example, in U.S. Pat. Nos. 5,695,797 (1997) and 5,968,569 (1999) to Nestec S. A.; U.S. Pat. Nos. 4,055,681 (1977), 4,228,195 (1980) 4,524,081 (1985) and 4,895,731 (1990) to The Quaker Oats Company; U.S. Pat. Nos. 4,190,679 (1980), 4,495,208 (1985) to General Foods Corporation; U.S. Pat. No. 4,310,558 (1982) to Ralston Purina Company; U.S. Pat. No. 4,784,860 (1988) to Novo Industri A/S; U.S. Pat. Nos. 4,910,038 (1990) and 5,045,339 (1991) to Huntington Hyde Ltd., Ind.; U.S. Pat. No. 5,294,458 (1994) to Maruha Corporation; U.S. Pat. Nos. 5,431,927 (1995); 5,500,239 (1996) and Pat. No. 5,690,988 (1997) to Colgate Palmolive Company; U.S. Pat. Nos. 5,616,569 (1997) and 5,851,573 (1998) to The Iams Company; U.S. Pat. No. 5,894,029 (1999) to Purebreed Pet Product, Inc.

Although these patents claim higher nutrition or improved palatability of their pet food products, none mentions the source of ingredients as part of their manufacturing process.

All the pet foods heretofore known suffer from a number of disadvantages:

a) Their manufacture focuses on the palatability of the product with no regards to the nutritional content.

b) Products with high nutritional contents offer low palatability, leading to the pet eating less, therefore not getting the nutrients that the food product intends to deliver.

c) Products designed to alleviate a specific ailment in the pet, with no regards to the overall health of the animal or the product's palatability.

SUMMARY

In accordance with the present invention a highly palatable pet food formulated from a combination of proteinaceous and farinaceous ingredients certified kosher and manufactured following kosher guidelines.

Objects and Advantages

Accordingly, several objects and advantages of the present inventions are:

a) to provide a highly palatable pet food.

b) to provide a pet food which is highly nutritional for pets regardless of their ages, ailments, or levels of activity.

c) To provide a pet food that does not promote debilitating diseases: slaughtered meat must be kashered, a process that involves the use of COLD water (warm water being a breeding ground for bacteria) and an extensive salting and soaking process that lessen the risk of formation of nitrosamines, cancer-causing agents. Salting can also reduce or eliminate some types of bacteria, especially campylobacter, a common contaminant of poultry. It also appears to reduce the risk of salmonella in chicken.

d) To provide high quality meat-based pet food: animals for ail slaughter must be in good health. Diseased animals are automatically considered non-kosher. In order to ensure the wholesomeness of the meat, immediately after slaughter the animal's lungs and other internal organs are checked by a trained inspector for any physiological abnormalities or symptoms of diseases. Animals with certain types of adhesions, cuts, or bruises are entirely rejected. There are over 70 defects that render an animal unsuitable for consumption.

e) To provide a natural pet food: kosher poultry must be raised without hormones or growth stimulants.

Further objects and advantages are to provide a pet food which can be served daily, with noticeable improvements to the animal's health, yet can easily be mass manufactured at a reasonable cost once the initial koshering process is completed. Additionally, the product will be instantly embraced by people of Jewish faith who wish to keep a kosher home. Still further objects and advantages will become apparent from a consideration of the ensuing description and drawings.

DRAWING FIGURES

FIG. 1 shows the composition of the pet food, which can be produced either moist for canned purposed or can be dehydrated.

FIG. 2 shows the high meat content of the present invention. Indeed, dogs and cats are meat eaters. Research has proven that a strictly vegetarian diet, or even a diet too low in meat, can cause diseases in cats and dogs. An often-fatal heart disease in cats and some dogs was shown to be caused by a deficiency of an amino acid only found in meat called taurine. Blindness is another symptom of taurine deficiency.

DETAILED DESCRIPTION OF THE PREFERRED EMBODIMENTS

The pet food composition of the present invention may be provided in any suitable form as long as it contains kosher ingredients in the nutrient profiles mandated by the AAFCO.

It has been discovered that pet foods with a complete protein source has a high digestibility factor which promotes a pet's health by allocating its digestive resources to the acquisition of required nutrients instead of elimination of fillers. Digestibility refers to the quantity of the food that is actually absorbed by the pet's system. By providing a kosher meat protein source to the pet's diet (complete proteins: minimum 18% dry mass for adult/maintenance and 22% dry mass for growth foods) the amount of feces is reduced by 12–18%. The pet food composition of the present invention preferably comprises only about 40% dry mass carbohydrates in the form of starch as in corn, rice, oats, potatoes and wheat, which maintains an appropriate ratio of energy to protein in the diet.

Suitable sources of fat include poultry, chicken, and turkey fat.

The pet food composition preferably further includes at least 2.44% omega-6 fatty acids and at least 0.49% omega-3 fatty acids.

The composition preferably includes about 5% by weight fiber. Suitable sources of fiber include kosher vegetables, dried or whole, kosher fruits, dried or whole, whole grains, and mixtures thereof.

The composition may also contain mixtures of vitamins and minerals including, but not limited to, zinc oxide, vitamin E, ascorbic acid, copper sulfate, manganese sulfate, biotin, manganous oxide, vitamin A acetate, calcium pantothenate, thiamine mononitrite, Vitamin $B_{12}$ supplement, niacin, riboflavin supplement, inositol, Vitamin $B_6$, potassium iodide, Vitamin $D_3$ supplement, folic acid, sodium selenite, and cobalt carbonate.

CONCLUSION, RAMIFICATION, AND SCOPE

Accordingly, the reader will see that the present invention offers advantages to pets, their owners, and pet food manufacturers.

a) The pet food is highly palatable with a high digestibility factor, promoting the pet's health (more nutrients absorbed with less efforts eliminating).

b) Pet owners deal with a lesser amount of waste (feces) and enjoys the companionship of a healthier pet.

c) Pet owners can share their philosophical believes with their pets.

d) Pet food manufacturers will find an immediate market amongst Jewish pet owners and other pet owners concerned with their pet's health.

Although the pet food of the present invention has been described with specificity by examples with specific components and specific ranges of components, it will be apparent to those of ordinary skill in the art that many modifications or substitutions with comparable components may be made to the pet food and the method for making the food which are suggested by the present invention and considered to be within the scope of the present invention.

What is claimed is:

1. A pet food composition comprising from about 15 to 60 weight percent of kosher meat wherein the kosher meat is from a healthy animal, is washed in cold water and salted, said composition further comprising a source of carbohydrates, a source of fiber, a source of fat and at least 2.44% omega-6 fatty acids and at least 0.49% omega-3 fatty acids.

2. A pet food in accordance with claim 1 wherein said carbohydrate source consists essentially of rice and flour, said fiber source consists essentially of carrots and said fat source consists essentially of a kosher meat source.

3. A pet food in accordance with claims 1 or 2 where all ingredients used are certified kosher and the method of preparation is in accordance with kosher guidelines.

* * * * *